Nov. 15, 1949    C. G. LEMON    2,488,211
HIGH-FREQUENCY CABLE
Filed Nov. 29, 1944    2 Sheets-Sheet 2

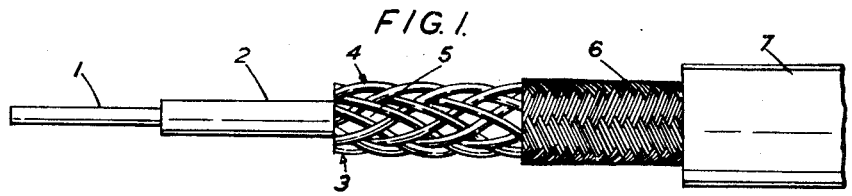
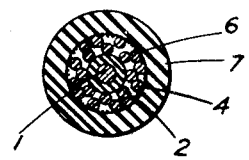
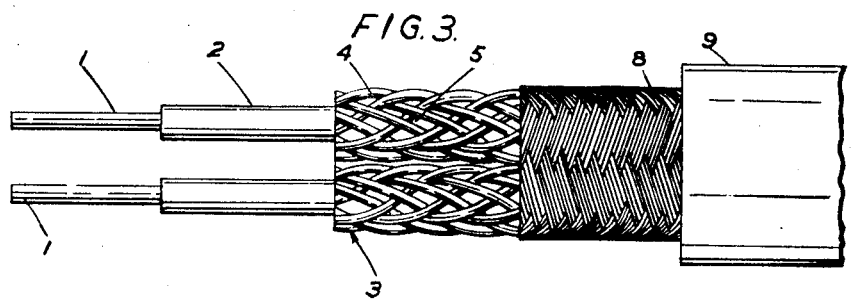
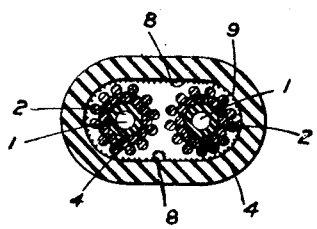
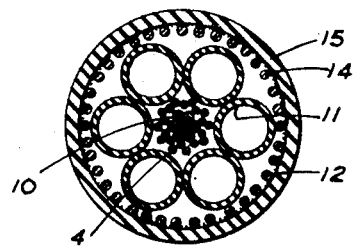
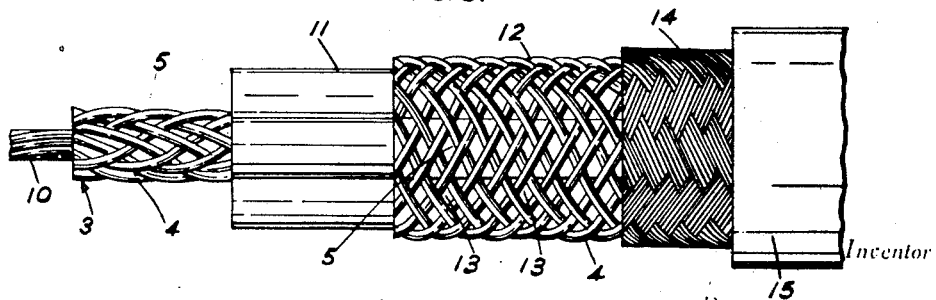

Inventor
CECIL GEORGE LEMON
By
Whittemore Hulbert & Belknap
Attorneys

UNITED STATES PATENT OFFICE 2,488,211

HIGH-FREQUENCY CABLE

Cecil George Lemon, London, England, assignor to Tenaplas Limited, London, England, a British company Application November 29, 1944, Serial No. 565,701
In Great Britain April 1, 1943

Section 1, Public Law 690, August 8, 1946
Patent expires April 1, 1963

5 Claims. (Cl. 174—28)

This invention relates to high frequency cables and especially those which comprise one or more conductors insulatedly spaced from a surrounding metallic screen by an insulating carrier arranged around the cable so as to support the screen.

In the construction of such cables it is desirable to have as much as possible of the space around the conductor occupied by an insulating fluid, e. g., air or other dry inert insulating gas or petroleum, and to employ to a minimum extent the necessary insulating means between the screen and conductor or conductors.

According to the invention, this object is achieved by providing a high frequency cable in which at least one electrical conductor is insulatedly supported within a conducting screen by screen carrying means comprising a combination of insulating open-mesh braiding and longitudinally continuous insulating sheathing both formed of thermoplastic synthetic resin, the said braiding comprising a number of elongated elements, i. e., cords or tubes, braided around the conductor so that a substantial proportion of the space between the conductor and the screen is free of solid dielectric and contains, or is adapted for the reception of, insulating fluid.

The said insulating fluid may be a gas, e. g., dry air or nitrogen, or a liquid, e. g., petroleum.

The braiding of the said cords or tubes of insulated material around the conductor may be effected by any of the well known braiding machines, especially those commonly used for braiding wire upon cables.

The cable according to the invention may comprise two or more layers of insulating braiding with an insulating sheath between the innermost layer of braiding and the conductor and/or between each layer of braiding, with or without an insulating sheath outside the outermost layer of braiding.

The insulating sheathing may be formed of longitudinal elements, i. e., tubes, cords or rods, arranged around the conductor with their longitudinal axes parallel to the latter. Such tubes, cords or rods may be in side by side contact with one another. Instead of arranging a series of tubes side by side and longitudinally of the conductor in this way these tubes may be formed integrally together, as by extrusion, so as to comprise a body provided with a series of side by side longitudinal passages, which body will, however, be regarded herein as side-by-side tubes.

In another arrangement the insulating sheathing or one or more of the insulating sheaths is or are longitudinally open, (i. e., split and/or perforated) sleeves. Splitting the sleeve or sleeves longitudinally assists materially in applying it or them to the conductor or the insulant therearound; moreover, as the splits are open they provide free spaces for the reception of the fluid dielectric. A series of such open split sleeves may be arranged about the conductor with their splits staggered in relation to one another.

The free spaces within the screen may be filled with dry air or dry nitrogen or any other suitable insulating gas or liquid as stated above. If a gas is employed it may be at a pressure above atmospheric pressure and the cable is sealed peripherally and at the ends, one end of the cable being provided with a suitable non-return sealing valve to enable gas to be introduced into the cable and held within the free spaces thereof. The ends of the cable are preferably constructed so as to enable them rapidly to be coupled in end to end relationship with other similar cables or other apparatus.

It will be understood that the characteristics of the cable, the ratio of air to solid insulant, and/or the radial thickness of the insulant, may be varied, for instance, by varying the thickness of the cords or tubes of the braiding and/or of the insulating sheathing or the thickness of the tubes, cords or rods or the wall thickness of the tubes constituting the latter where the sheathing is formed of tubes, cords or rods, and so the size of the free spaces provided thereby, and/or by including one or more split sleeves, in addition to the aforesaid braiding, and/or by varying the pitch of the braiding, which operation has the effect of correspondingly varying the size of the free spaces in the braiding.

The thermoplastic synthetic resin employed should be possessed of the desired electric properties, namely, high dielectric properties and a low power factor, and should have the necessary physical properties.

The said thermo-plastic synthetic resin may be formed of the polymer of ethylene known as polythene or any of the well known polymers of styrene, and the thermoplastic material may be extruded in the required shape. The materials just mentioned are, of course, vinyl resin plastics, and one of the well known polymers of styrene that may be effectively employed in carrying out the present invention, is polystyrene.

The various alternative forms of the thermoplastic synthetic resin which have hereinbefore been described can be used alone or in any desired combination.

The screen is preferably in the form of a metallic braided sleeve or sleeves, but could be of other form, for example, lapped metallic tape, and such screen may be enclosed in one or more outer insulating covers, for example, a thermoplastic material extruded upon the cable.

In order that the invention may be thoroughly understood and readily carried into practice, various embodiments of the same are illustrated by way of example in the appended drawings in which all the figures illustrate portions of cables, the various plan views of the cables showing the successive concentric or annular layers around the conductor or conductors removed in stepped arrangement to illustrate the construction of the cable. In the drawings:

Figure 1 is a plan view of one form of a single conductor cable constructed in accordance with this invention;

Figure 2 is a cross-section through such a cable;

Figure 3 is a plan view of one form of a twin conductor in accordance with this invention;

Figure 4 is a cross-section through the said cable;

Figure 5 is a plan view of a portion of a further embodiment of the invention;

Figure 6 is a section through the cable shown in Figure 5;

Figure 7:
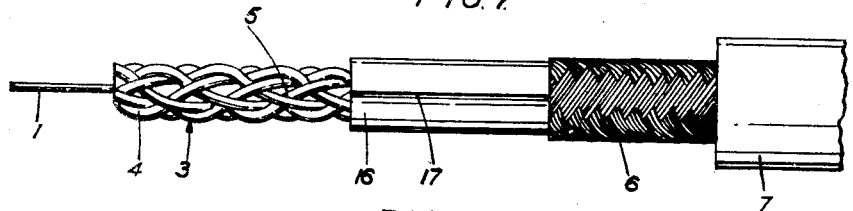
Figure 8:
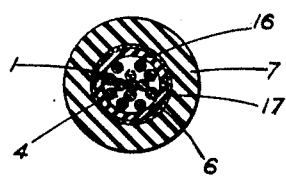
Figure 9:
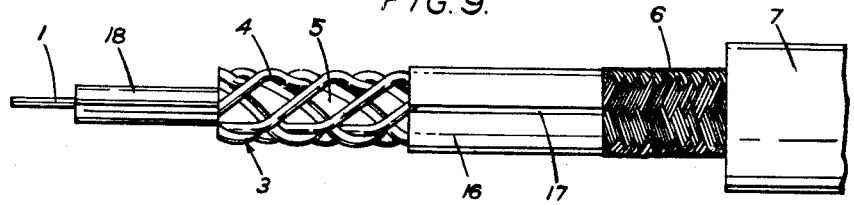
Figure 10:
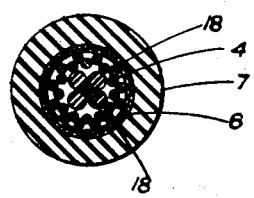
Figure 11:
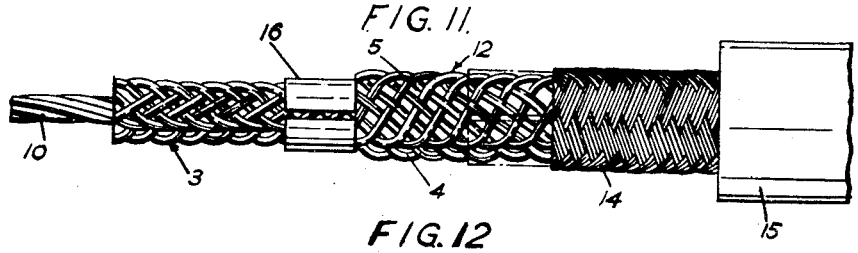
Figure 12:
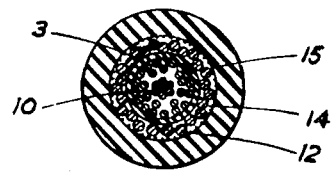

Figure 7 and 8, respectively, are a plan and section of a further form of cable constructed in accordance with this invention;

Figures 9 and 10 show a still further embodiment of this invention, respectively, in plan and in cross-section, and Figures 11 and 12 show a yet still further embodiment of the invention in plan and cross-section respectively.

In the embodiment of the invention shown in Figures 1 and 2, the cable comprises a single central conductor 1 which, in the embodiment illustrated, comprises a single strand of wire. This conductor could, however, be composed of a plurality of strands of wire appropriately twisted together if desired. The conductor is surrounded by an annular layer 2 of flexible thermo-plastic synthetic resin of any desired or preferred composition, which has been extruded on to the conductor.

Around the outside of the insulating layer 2 is arranged an open mesh woven insulating sleeve 3 formed from cord or tube 4 of thermo-plastic synthetic resin. The sleeve 3 is braided on to the conductor and its insulating layer 2 by means of a braiding machine, for example, of the kind used for braiding textile or metal strands upon electric cables.

The cords or tubes 4 pass around the conductor 1 helically some in one direction and others in the opposite direction, the cords being interwoven or interlaced so as to be securely positioned with respect to one another and so as to leave cells 5 which may, in the finished cable be filled with air or, in appropriate conditions, with other insulating gases, such for example, dry nitrogen, or with a liquid, for example, petroleum, suitable sealing means being provided, where necessary, for retaining the insulating fluid within the cable.

Around the braided layer of insulant 3 is braided a metallic screen 6 and upon and around this is extruded an annular insulating layer 7 formed of any appropriate material, for instance, polyvinyl chloride.

Figures 3 and 4 show a cable having two conductors 1, these two conductors being mutually insulatedly carried in side by side parallel relationship within a common braided metallic screen 8 and a common insulating external layer 9, but otherwise being of the same construction as the cable shown in Figures 1 and 2.

The cable illustrated in Figures 5 and 6 comprises a central multi-strand conductor 10 around which cords or tubes 4 of extruded polymerized ethylene, i. e., polythene, are braided to form an open mesh annular insulating layer 3 having cells 5 as described with reference to Figures 1 and 2. Around this insulating layer 3 are arranged in side by side parallel relationship and with their axes parallel to the conductor 10 a plurality of insulating tubes 11. These tubes are of any suitable diameter depending upon the characteristics of the cable it is desired to produce and their hollow interiors form additional free spaces or cells for fluid insulant.

The tubes 11 are preferably formed of an extruded thermoplastic synthetic resin, and conveniently are made of the same synthetic resin as the cords from which the annular insulating layer 3 is formed.

Around the parallel tubes 11 is a further annular layer 12 formed of cords of thermoplastic synthetic resin, such as polymerized ethylene, i. e., polythene, braided together in open mesh form so as to provide numerous cells 13 which are capable of receiving fluid insulant. Around the annular layer 12 of braided cord or tube is arranged a metallic screen 14 which may be formed of braided strands of metallic wire and surrounded by an insulating sleeve 15.

The embodiment of the invention shown in Figures 7 and 8 resembles very closely that shown in Figures 1 and 2 with the exception that the braided cord 4 is mounted directly upon the conductor 1 instead of upon an insulating sleeve 2 previously extruded on to the conductor, and except for the fact that in the cable shown in Figure 7 a longitudinally split sleeve 16 formed of polythene or other suitable material is employed. The longitudinal split 17 of this sleeve enables the sleeve to be applied easily to the cable, but may also be employed, if open, to form an additional free space or cell to increase the capacity of the cable for fluid insulant, and, if desired, the sleeve 16 may be perforated or apertured in any suitable manner further to increase the insulating fluid receiving capacity of the cable.

If desired a plurality of longitudinally split (and if desired perforated or apertured) sleeves, such as sleeve 16, may be arranged on the cable, preferably so that the longitudinal gaps in successive sleeves are out of register and open to provide a plurality of longitudinal cells for the fluid insulant.

Figures 9 and 10 illustrate a further modification of the cable shown in Figures 7 and 8, this modification residing in the provision around the conductor 1 and between the latter and the braided sleeve 3 of a plurality of parallel cords, rods or tubes 18 of insulating material arranged parallel to the axis of the conductor 1, which cords, rods or tubes further increase the number of cells provided in the solid insulant.

Figures 11 and 12 illustrate a cable similar to that shown in Figures 5 and 6, but in which the annular layer of parallel tubes 11 of insulating material have been omitted, the layers 3 and 12 of braided cord in this case lying one directly upon the other. In this embodiment of the invention, the two layers of braided cord are separated by one or more longitudinally split sleeves, such as the sleeve 16 described with reference to Figures 7 and 9. A similar sleeve could be introduced between the metallic screen 14 and the annular braided layer 12. In Figure 11, the sleeve 16 is indicated in dot-and-dash lines, and the sleeve between the metallic screw 14 and the annular braided layer 12 is similarly indicated.

It will readily be understood that by constructing the screen carrier in accordance with this invention the insulant between the conductor or conductors and the screen can be primarily the fluid insulant. It has been found possible by this means to employ upwards of 60% fluid insulant, although a high percentage of solid insulant may be used if desired.

The expression "longitudinally continuous sheathing" or "longitudinally continuous sheath" or "longitudinally continuous sheaths" used in the appended claims is intended to include integral sheathing which is imperforate or perforated.

What I claim is:

1. A high frequency cable comprising conducting means consisting of at least one electrical conductor, a screen, and screen carrying means insulatedly supporting said conducting means within said screen and comprising open-mesh insulating braiding and longitudinally continuous insulating sheathing comprising at least one sleeve formed by side-by-side longitudinal tubular elements, said braiding and said sheathing being formed of thermoplastic synthetic resin and said braiding comprising a plurality of elongated elements braided into tubular form so as to encase said conducting means circumferentially, said open-mesh insulating braiding providing spaces between the strands thereof, free of solid dielectric and disposed between said conducting means and said screen adapted for the reception of insulating fluid.

2. An electric cable having low capacity and small loss angle, comprising a wire conductor; a tubular braided flexible conductor surrounding said wire conductor and coaxial therewith; and insulating spacing means separating said two conductors and comprising two insulating open braided sleeves surrounding said wire conductor and composed of vinyl resin plastic, whereby the dielectric between said conductors consists largely of air.

3. An electric cable having low capacity and small loss angle, comprising a wire conductor; a tubular woven flexible conductor surrounding said wire conductor and coaxial therewith; and insulating spacing means separating said two conductors and comprising two insulating open braided sleeves surrounding said wire conductor and composed of polystyrene, whereby the dielectric between said conductors consists largely of air.

4. An electric cable having low capacity and low loss angle, comprising a wire conductor; a tubular braided flexible conductor surrounding said wire conductor; and insulating spacing means separating said two conductors and comprising two insulating layers surrounding said wire conductor, at least the outer layer constituting an open braided sleeve surrounding said wire conductor and composed of vinyl resin plastic, whereby the dielectric between said conductors consists largely of air.

5. An electric cable, as set forth in claim 4, wherein said open braided sleeve is composed of polystyrene.

CECIL GEORGE LEMON.

REFERENCES CITED

The following references are of record in the file of this patent:

UNITED STATES PATENTS

| Number | Name | Date |
|---|---|---|
| 424,575 | Reed | Apr. 1, 1890 |
| 2,116,268 | Klimmer | May 3, 1938 |
| 2,197,616 | Lehne et al. | Apr. 16, 1940 |
| 2,204,737 | Swallow et al. | June 18, 1940 |
| 2,253,967 | Carl et al. | Aug. 26, 1941 |

FOREIGN PATENTS

| Number | Country | Date |
|---|---|---|
| 360,743 | Italy | July 5, 1938 |
| 476,110 | Great Britain | Nov. 29, 1937 |
| 776,017 | France | Oct. 22, 1934 |